United States Patent
Dang et al.

(10) Patent No.: US 10,176,246 B2
(45) Date of Patent: Jan. 8, 2019

(54) FAST GROUPING OF TIME SERIES

(71) Applicant: Microsoft Technology Licensing, LLC, Redmond, WA (US)

(72) Inventors: Yingnong Dang, Beijing (CN); Qiang Wang, Beijing (CN); Qianchuan Zhao, Beijing (CN); Shulei Wang, Hangzhou (CN); Rui Ding, Beijing (CN); Qiang Fu, Beijing (CN); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 433 days.

(21) Appl. No.: 14/898,216

(22) PCT Filed: Jun. 14, 2013

(86) PCT No.: PCT/CN2013/077213
§ 371 (c)(1),
(2) Date: Dec. 14, 2015

(87) PCT Pub. No.: WO2014/198052
PCT Pub. Date: Dec. 18, 2014

(65) Prior Publication Data
US 2016/0140208 A1    May 19, 2016

(51) Int. Cl.
*G06F 17/00* (2006.01)
*G06F 17/30* (2006.01)
*G06F 17/18* (2006.01)
*G06K 9/00* (2006.01)
*G06K 9/62* (2006.01)

(52) U.S. Cl.
CPC ........ *G06F 17/30598* (2013.01); *G06F 17/18* (2013.01); *G06F 17/3033* (2013.01); *G06F 17/30943* (2013.01); *G06K 9/0055* (2013.01); *G06K 9/6222* (2013.01)

(58) Field of Classification Search
CPC ................ G06F 11/348; G06F 11/349; G06F 17/30705; G06F 2201/81; G06F 2201/88
See application file for complete search history.

(56) References Cited

U.S. PATENT DOCUMENTS

| | | | |
|---|---|---|---|
| 7,103,222 B2 | 9/2006 | Peker | |
| 7,809,824 B2 | 10/2010 | Wei et al. | |
| 8,385,662 B1 | 2/2013 | Yoon et al. | |

(Continued)

OTHER PUBLICATIONS

"Office Action Issued in European Patent Application No. 13887005.0", dated Feb. 19, 2018, 6 Pages.

(Continued)

*Primary Examiner* — Truong V Vo
(74) *Attorney, Agent, or Firm* — Schwegman Lundberg & Woessner, P.A.

(57) ABSTRACT

In some examples, a time-series data set can be analyzed and grouped in a fast and efficient manner. For instance, fast grouping of multiple time-series into clusters can be implemented through data reduction, determining cluster population, and fast matching by locality sensitive hashing. In some situations, a user can select a level of granularity for grouping time-series into clusters, which can involve trade-offs between the number of clusters and the maximum distance between two time-series in a cluster.

10 Claims, 6 Drawing Sheets

(56) References Cited

U.S. PATENT DOCUMENTS

| | | | |
|---|---|---|---|
| 2003/0208523 A1* | 11/2003 | Gopalan | H04L 41/5009 709/201 |
| 2004/0064290 A1 | 4/2004 | Cabral et al. | |
| 2005/0246161 A1 | 11/2005 | Sakurai | |
| 2006/0271533 A1* | 11/2006 | Sakurai | G06F 17/30705 |
| 2010/0145961 A1 | 6/2010 | Hu et al. | |
| 2012/0215523 A1 | 8/2012 | Inagaki | |

OTHER PUBLICATIONS

Supplementary European Search Report dated May 30, 2016 for European patent application No. 13887005.0, 4 pages.
Camerra, et al., "iSAX 2.0: Indexing and Mining One Billion Time Series", In Proceedings of the IEEE International Conference on Data Mining, Dec. 13, 2010, 10 pages.
Ding, et al., "Querying and Mining of Time Series Data: Experimental Comparison of Representations and Distance Measures", In 34th International Conference on Very Large Data Bases, vol. 1, Issue 2, Aug. 23, 2008, 11 pages.
Jiang, et al., "Interactive Exploration of Coherent Patterns in Time-series Gene Expression Data", In Proceedings of the 9th ACM SIGKDD Conference on Knowledge Discovery and Data Mining, Aug. 24, 2003, 6 pages.
Liao, T.Warren, "Clustering of Time Series Data—A Survey", In Journal of Pattern Recognition, vol. 38, Issue 11y, Nov. 2005, 18 pages.
Lin, et al., "A Symbolic Representation of Time Series, with Implications for Streaming Algorithms", In Proceedings of the 8th ACM SIGMOD Workshop on Research Issues in Data Mining and Knowledge Discovery, Jun. 13, 2003, 10 pages.
PCT Search Report and Written Opinion dated Mar. 20, 2014 for PCT Application No. PCT/CN2013/077213 , 10 Pages.
Rakthanmanon, et al., "Time Series Epenthesis: Clustering Time Series Streams Requires Ignoring Some Data", In Proceedings of the 11th IEEE International Conference on Data Mining, Dec. 11, 2011, 10 pages.
Shieh, et al., "iSAX: Disk-Aware Mining and Indexing of Massive Time Series Datasets", In Journal of Data Mining Knowledge Discovery, vol. 19, Issue 1, Aug. 2009, 34 pages.
Wang, et al., "A Scalable Method for Time Series Clustering", In Tech Report, Department of Econometrics and Business Statistics Monash University, Jan. 2004, 20 pages.
Wang, et al., "Finding Semantics in Time Series", In Proceedings of the ACM SIGMOD International Conference on Management of Data, Jun. 12, 2011, 12 pages.
First European Office Action dated Jun. 27, 2016 for European Patent Application No. 13887005.0, a counterpart foreign application of U.S. Appl. No. 14/898,216, 5 pages.
"First Office Action Issued in Chinese Patent Application No. 201380077452.3", dated May 3, 2018, 6 Pages.

* cited by examiner

FAST GROUPING OF TIME SERIES

TECHNICAL FIELD

This disclosure relates to the technical field of data analysis.

BACKGROUND

Data in the form of a time-series is common in many fields, including science, engineering, and business. Analyzing one or more time-series can provide valuable insights. For example, operating engineers managing thousands of machines running different services in a cloud can monitor CPU usage and memory consumption of the machines. In order to improve resource allocation and capacity planning, operating engineers may collect and analyze one or more time-series of data points that represent CPU usage and memory consumption for one or more corresponding machines. Thus, an operating engineer may have many different time-series that represent CPU usage for many different machines. Due to the large amount of data associated with different time-series, an operating engineer may find it challenging to organize the data and to recognize patterns or similarities across many different machines.

SUMMARY

Implementations described herein provide for analyzing and grouping a time-series data set in a fast and efficient manner. Fast grouping of multiple time-series into clusters can be implemented using several techniques, even with limited information or no prior knowledge regarding characteristics of the multiple time-series. Examples of such techniques include data reduction by multi-step sampling, data characteristic estimation, and by clustering a sampled set. In some implementations, a user can control time-series grouping results by selecting a level of granularity. A finer granularity level will output smaller sized clusters with smaller maximum distance between time-series pairs in a cluster, and a relatively large number of clusters. A less fine granularity level will output relatively larger sized clusters.

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Fast Grouping of Multiple Time-Series

Figure 1:
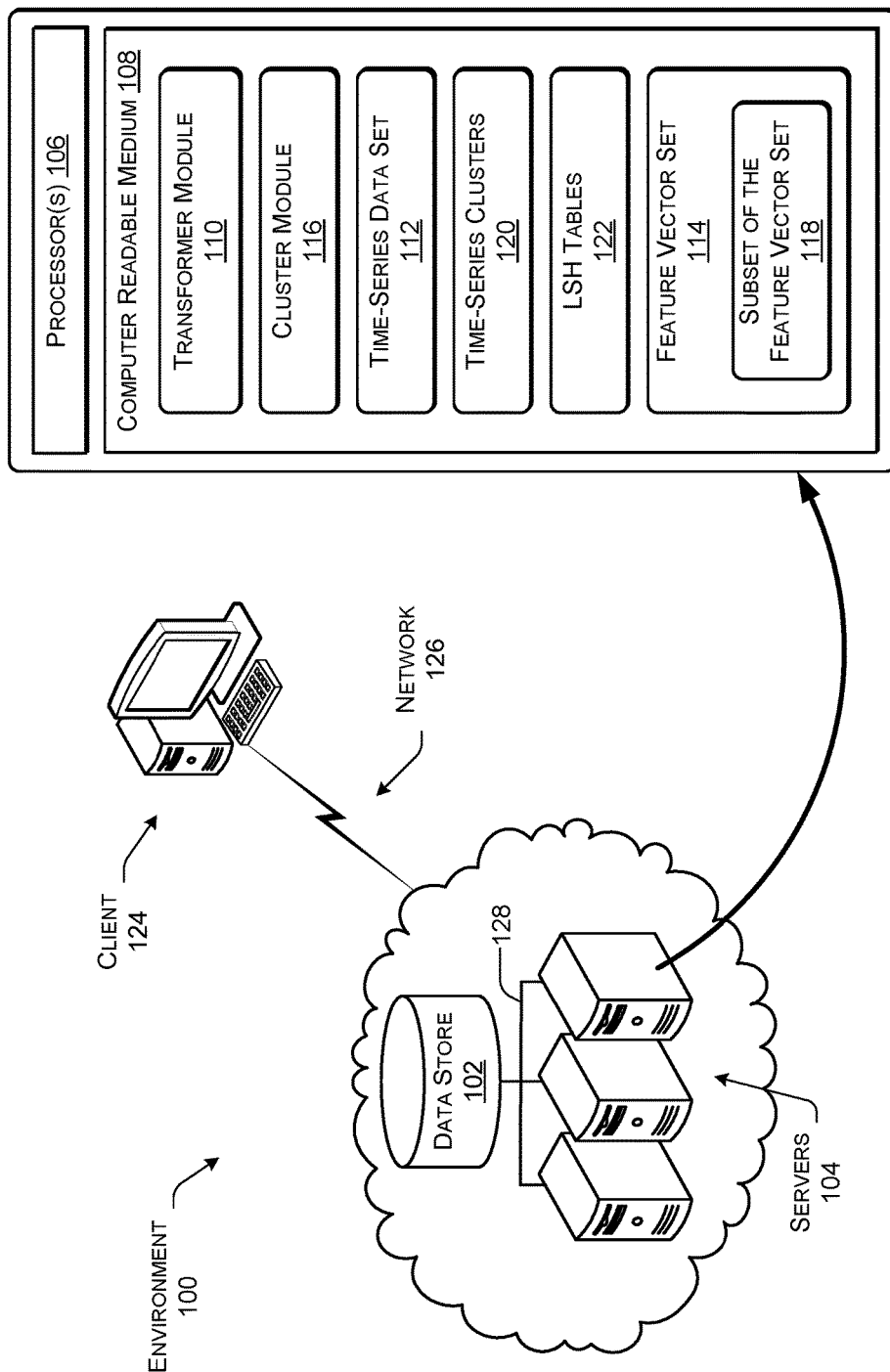
FIG. 1 is a block diagram illustrating an example environment including select components for performing grouping of multiple time-series according to some implementations.

The technologies described herein are generally directed toward grouping multiple time-series. As used herein, a time-series is a series of numerical values or data points. For example, a time-series can be a series of values that is stored or presented in an order corresponding to a point in time that each value was collected. A time-series data set is a collection of at least two time-series. In some implementations, a time-series data set is a collection of one or more time-series. Multiple time-series can be more efficiently analyzed by organizing them into different groups. For example, two or more time-series with similar characteristics or patterns can be organized into the same group or cluster. In some implementations, each time-series of a time-series data set has the same number of numerical values or data points.

Time-series analytics may involve pivoting based upon time-series data or a single-value. Pivoting may involve operations such as group-by, sorting, and filtering against a data set, the results of which can be presented on a display. For example, in the domain of system management, operating engineers may be interested in learning about usage patterns of many different machines during a certain period of time. System operators may wish to understand usage patterns (e.g., CPU usage) of a subset of the machines, which could be a set of machines that are filtered by a single-valued attribute (e.g., the type of service running on the machine). In other cases, the set of machines can be filtered by a particular type of usage pattern associated with a time-series attribute (e.g., a memory consumption pattern or CPU usage pattern). Thus, machines that exhibit a particular pattern of memory usage over a particular time interval can be identified and presented to a user.

In some implementations, to enable pivoting with either a time-series attribute or a single-valued attribute, patterns of time-series attributes (e.g., patterns of CPU usage of hundreds of thousands of time-series in one day) are obtained or identified via clustering. In some examples, a time-series clustering algorithm fulfills at least two goals in order to support pivoting for multiple time-series. The first goal is for the clustering algorithm to be fast and scalable. To support a smooth user experience associated with pivoting, it is important that the underline analysis engine has real-time or approximately real-time response for a user's pivoting. Data sets can be extremely large. For example, a datacenter may have hundreds of thousands of machines, with a time-series associated with each machine.

The second goal is for the algorithm to provide for clustering data with unknown characteristics or clustering data with limited information regarding characteristics of the data. It may be difficult to determine the populations of time-series patterns in a data set, such as the number of clusters and the density of clusters, because data may be different in different domains. Moreover, even in the same domain, the characteristics of different time-series attributes may be different (e.g., CPU usage, memory consumption).

Furthermore, one type of time-series may have different cluster populations at a different time period.

In order to make an algorithm fast and scalable, multi-step sampling may be used to reduce computational cost of identifying cluster centers, while retaining enough accuracy for cluster-center identification. Then, a locality sensitive hashing (LSH) technique may be used to match each time-series of the data set against the identified cluster centers and to assign each time-series to the closest cluster. In some implementations, multi-step sampling may include at least two steps or processes. The first step is using piece-wise aggregation approximation (PAA) to perform data-dimension reduction, or other suitable data-dimension reduction techniques, such as discrete Fourier transform, discrete wavelet transform, and discrete cosine transform. In some implementations, parameters used for PAA will be determined by the algorithm. The second step is to perform time-series sampling, which includes selecting a subset of time-series to represent the time-series data set distribution as an approximation. After the above steps, a sampled time-series data set is obtained, with reduced dimensionality, with fewer data points than the original time-series data set. A clustering algorithm can then be applied on the sampled time-series data set, in order to obtain a set of cluster centers. Then, a locality sensitive hashing (LSH) technique is implemented to match each time-series of the data set against obtained cluster centers to assign each time-series to the closest cluster. Other suitable matching techniques may be used in place of LSH, such as computing the distance between a time-series and all time-series cluster centers (e.g., instead of computing the distance between a smaller portion of time-series cluster centers with a matched LSH value, as above).

In some implementations, in order to process various time-series with limited or no knowledge regarding characteristics of the time-series, an algorithm uses an iterative approach to determine or estimate the population of clusters, which can include the number of clusters, the center of each cluster, and a distance threshold for clustering. In some implementations, most or all of the clustering parameters are determined by the clustering algorithm. Furthermore, in some implementations, a user specifies a level of clustering granularity, from rough to fine, which will cause the clustering algorithm to output a relatively small number of clusters to a relatively large number of clusters, respectively. In some implementations, the clustering algorithm is highly efficient and highly scalable.

In some implementations, a time-series data set is defined as $D=\{T_i\}$, $i=1, \ldots, N$, where $T_i$ is a time-series and N is the total number of time-series in D. A time-series T is defined as $T=\{t_i\}$, $i=1, \ldots, m$, where $t_i$ is a numerical value and m is the number of data points in a time-series. In some implementations, all time-series in D have the same number of data points.

In some implementations, a distance metric for time-series clustering may be defined. In some examples, such as high dimensional data mining applications, L1-norm may be used, rather than the Euclidean distance metric (L2-norm). Thus, in some implementations, $L_1$-norm distance is used as the distance metric.

In some implementations, given a time-series data set D and a clustering granularity level ($L=\{l\}$, $l=1, 2, \ldots, l_{max}$), an algorithm outputs a set of clusters of time-series $C_l= \{C_{l,i}\}$, where $|C_1| \geq |C_2| \geq \ldots \geq |C_{lmax}|$ and $|\bullet|$ indicates the number of clusters. In some implementations, the quality of the clustering result achieves the maximal value as an object function J based on $L_1$-norm distance.

Example Environment

FIG. 1 is a block diagram illustrating an example environment 100 including select components for performing grouping of multiple time-series data according to some implementations. The environment 100 includes a data store 102. Data store 102 can comprise any type of machines or storage devices suitable for data storage.

In the illustrated example, the environment 100 includes one or more servers 104, which can each include one or more processor(s) 106 and a computer readable medium 108. The processor 106 and the computer readable medium 108 are described in further detail below.

The environment 100 can include various modules and functional components for performing the functions described herein. In some implementations, the environment 100 can include a transformer module 110 for transforming a time-series data set 112 into a feature vector set 114, described in further detail below. Furthermore, a cluster module 116 can select a subset of the feature vector set 118 to generate time-series clusters 120, as described in further detail below. In some implementations, the cluster module 116 builds one or more LSH tables 122, which are used to generate time-series clusters 120, described below in further detail below.

In some examples, the functions performed by the transformer module 110 and the cluster module 116, along with other functions, can be performed by one module or by a larger number of modules than two. Additional aspects of the transformer module 110 and the cluster module 116 are discussed below. Moreover, the environment 100 can be interconnected to one or more clients 124 via a network 126, such as the Internet, in order to access the data store 102 and the servers 104. Furthermore, the one or more servers 104 can be interconnected via an intranet infrastructure (e.g., a local area network 128) within the environment 100. In some implementations, some or all of the information in computer readable medium 108 is stored in data store 102.

In some implementations, the cluster module 116 may collect multiple time-series that correspond to multiple computing devices, wherein each of the multiple time-series comprises a series of numerical values that represents resource consumption by one of the computing devices during a time period. For example, the cluster module 116 may collect a time-series that corresponds to two or more of servers 104, wherein each of the time-series represents resource consumption by a server, such as memory usage, CPU usage, or electricity usage.

Examples of Time-Series Clusters

Figure 2:
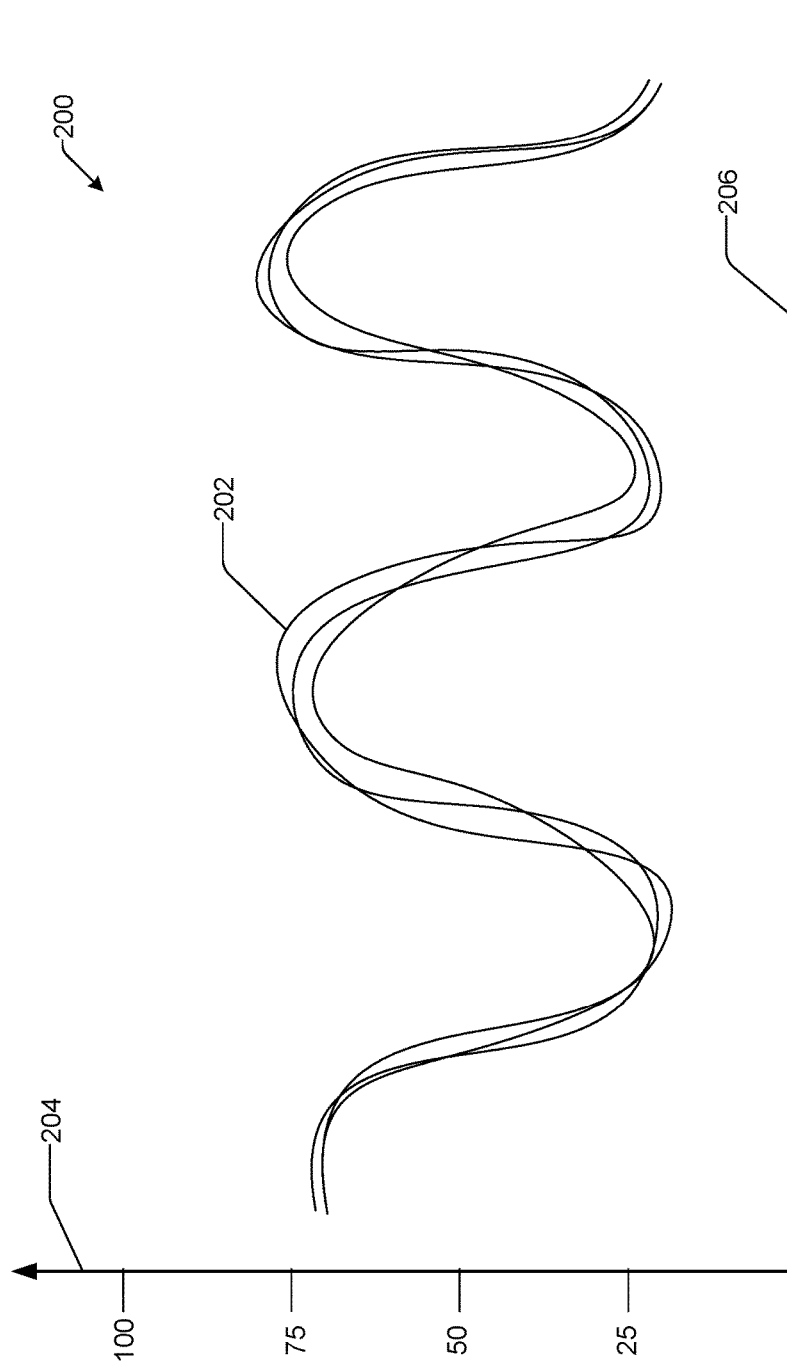
FIG. 2 illustrates an example of displaying a cluster of time-series according to some implementations.

FIG. 2 illustrates an example of displaying a cluster of time-series according to some implementations. In the example, a time-series cluster 202 is presented on a display, such as a monitor or other device suitable for presenting graphical output (e.g., a display on the client 124). The time-series cluster 202 includes three different time-series, each of which represents a percent of memory usage of a different computing device. In the example, the Y-axis 204 corresponds to memory usage and the X-axis 206 corresponds to time, with time increasing towards the right. Thus, the cluster module 116 can present a graphic representation of at least one of multiple clusters to indicate resource consumption (e.g., memory usage, CPU usage) of one or more of the computing devices during the time period. In the example, the cluster module 116 presents a cluster indicating resource consumption of three different computing devices.

In the example, all three time-series of the time-series cluster 202 exhibit a similar pattern of memory usage, which varies roughly between 25% and 75%. In some implementations, the cluster module 116 groups the three time-series to form the time-series cluster 202 based upon techniques described herein. In some implementations, a fewer or larger number of time-series is included in the time-series cluster 202. For example, the time-series cluster 202 may include 100 different time-series, each of which is displayed. In some implementations, a user may select a subset of time-series of the time-series cluster 202 to be displayed. In some implementations, after the user selects a number of time-series to be displayed as the subset, the cluster module 116 selects the number of time-series at random from the time-series cluster 302 for display. In some implementations, one or more additional clusters of time-series may also be displayed at the same time, allowing a user to make visual comparisons between different clusters and different time-series within each cluster.

Figure 3:
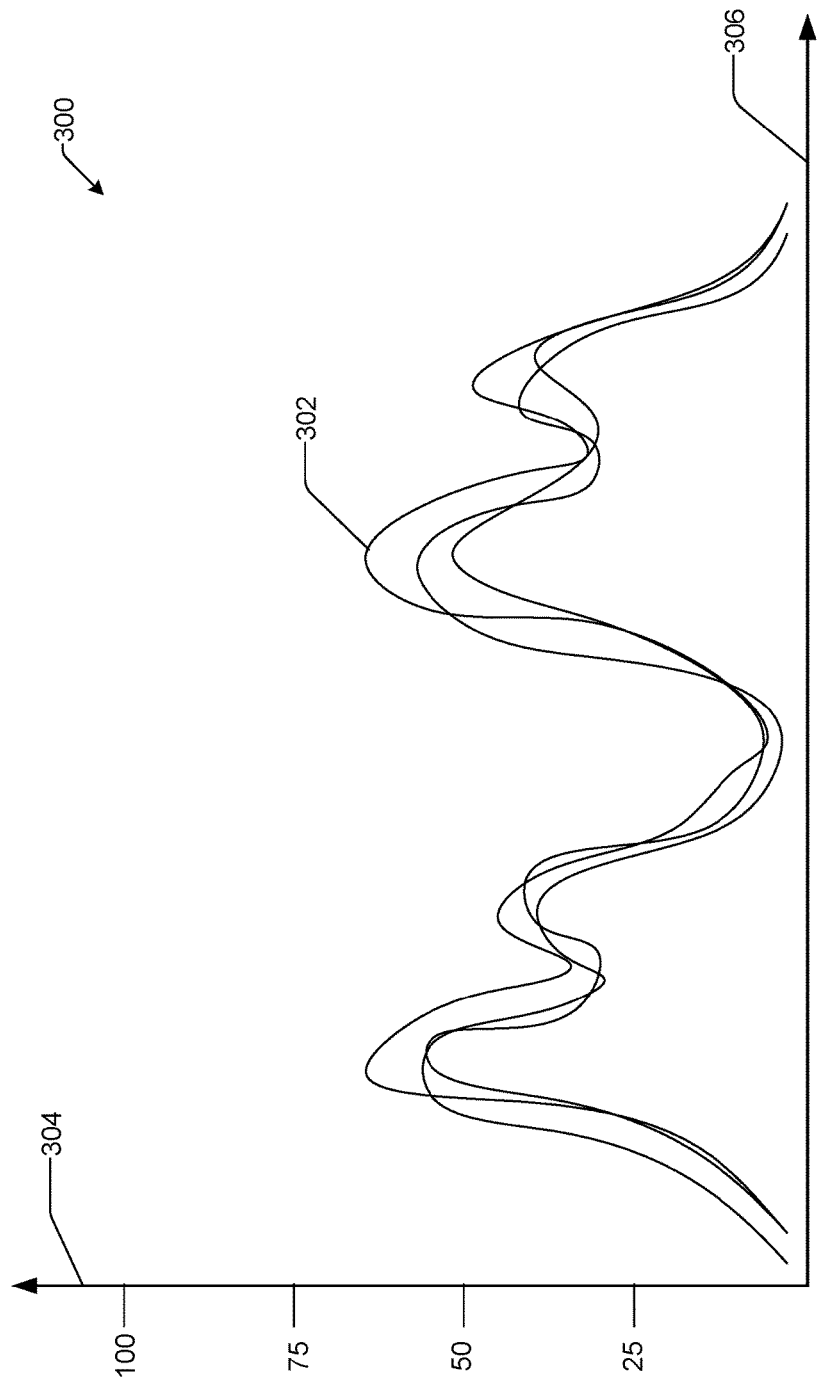
FIG. 3 illustrates an example of displaying a cluster of time-series according to some implementations.

FIG. 3 illustrates an example of displaying a cluster of time-series according to some implementations. In the example, a time-series cluster 302 is presented on a display, such as a monitor or other device suitable for presenting graphical output. The time-series cluster 302 includes three different time-series, each of which represents a percent of memory usage of a different computing device. As in FIG. 2, the Y-axis 304 corresponds to memory usage and the X-axis 306 corresponds to time, with time increasing towards the right.

In the example, all three time-series of the time-series cluster 302 exhibit a similar pattern of memory usage, which varies roughly between 0% and 50%. In some implementations, the cluster module 116 groups the three time-series to form the time-series cluster 302 based upon techniques described herein. In some implementations, a fewer or larger number of time-series is included in the time-series cluster 302. For example, the time-series cluster 302 may include 100 different time-series, each of which is displayed. In some implementations, a user may select a subset of time-series of the time-series cluster 302 to be displayed. In some implementations, after the user selects a number of time-series to be displayed as the subset, the cluster module 116 selects the number of time-series at random from the time-series cluster 302 for display. In some implementations, one or more additional clusters of time-series may also be displayed at the same time, allowing a user to make visual comparisons between different clusters and different time-series within each cluster.

Grouping Multiple Time-Series to Form Clusters

In some implementations, the cluster module 116 implements a clustering algorithm to automatically estimate or determine the population of clusters of a time-series data set. The population of clusters may be reflected by the number of clusters, the center of each cluster, and the diameter of each cluster. After determining the cluster population, each time-series is assigned to a cluster for which the time-series has the minimum distance from the cluster center compared with the distance from other cluster centers.

In some examples, a rough to fine approach for estimating cluster population is performed in three steps. In the first step, a subset of time-series is randomly sampled from a full time-series data set. The sampled subset of time-series may still reflect the characteristics of the full time-series data set. Thus, in some examples, each cluster may have some representatives in the sampled set, and larger clusters may have a larger number of time-series in the sampled set. In the second step, the transformer module 110 transforms the raw time-series data of the sampled subset to a code space with a reduced number of dimensions (e.g., by leveraging PAA and Symbolic Aggregate Approximation (SAX)). In the code space, time-series which are close to each other will have the same code or similar code. In some examples, a ranked list of code associated with a different number of time-series can be obtained by grouping the code. All time-series associated with the same code can be viewed as a community of time-series, since they are "roughly" close to each other. Conversely, time-series with different codes are "roughly" far away from each other. Thus, the majority of the population of time-series falls into the top communities.

In the third step, the cluster module 116 estimates or determines the real population from the top communities. First, the cluster module 116 estimates a center time-series to represent each community and an upper bound $d_{max}$ of the distance among the top communities. Then, the cluster module 116 clusters these center time-series of the top communities with a set of sampled values of distance thresholds in the range of $[0, d_{max}]$. By checking the quality of the clusters obtained with different distance thresholds, including the number of clusters and the internal quality of clusters, the cluster module 116 can determine a range of distance thresholds that is associated with the best quality of clustering results, as well as other cluster population information. The cluster module 116 can then build a mapping between the appropriate distance thresholds and different granularity levels.

In some implementations, in order to make the algorithm fast and scalable, two feature spaces are implemented with different data reduction rates. Thus, the transformer module 110 leverages both PAA and SAX for estimating a rough community of time-series. Final clustering is implemented by just applying PAA for data reduction, which can be much faster than working on the raw time-series space, while keeping acceptable accuracy. In some implementations, the cluster module 116 implements LSH to accelerate the process of assigning each time-series to its closest time-series cluster. Using LSH, it is not necessary to compute the distance between a time-series and all centers of time-series clusters, but only a small portion of time-series cluster centers that match the LSH value. Thus, the clustering algorithm can be implemented faster and more efficiently.

Figure 4:
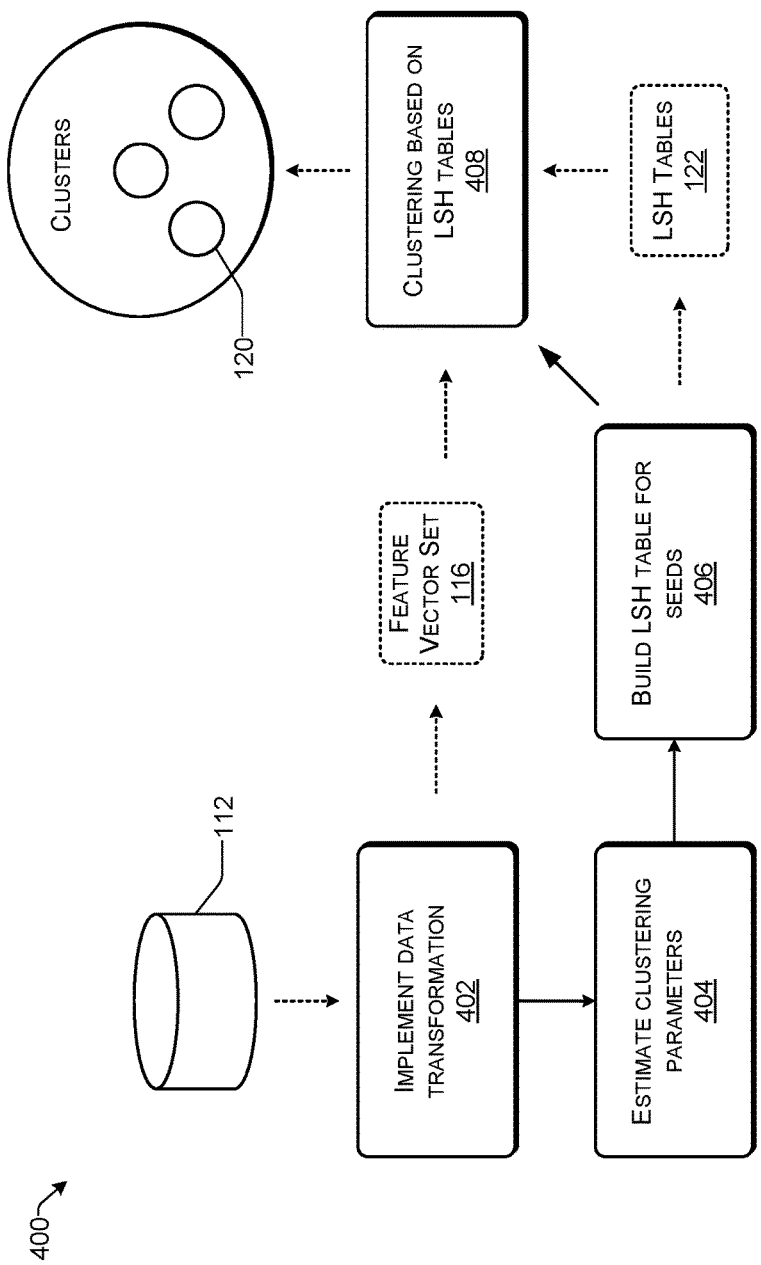
FIG. 4 is a flow diagram of an example process of assigning multiple time-series to clusters according to some implementations.

FIG. 4 is a flow diagram of an example process 400 of assigning multiple time-series to clusters according to some implementations. At step 402, given a time-series data set 112, the transformer module 110 implements data transformation. The transformer module 110 determines the best PAA parameter, which is the number of equally sized segments in which each time-series will be divided into. In response to determining the best PAA parameter, the transformer module 110 transforms the raw time-series data into a feature vector space using PAA to generate the feature vector set 114. At step 404, the cluster module 116 estimates clustering parameters. The cluster module 116 uses an iterative approach in a sampled data set to estimate clustering parameters, including the number of clusters, the center of each cluster, and the distance threshold for each granularity level. Based on the generated feature vector set 114 and the centers generated at step 404, at step 406, the cluster module 116 builds the LSH tables 122 for all of the centers.

At step 408, the cluster module 116 implements clustering based on the LSH tables 122 to generate the time-series clusters 120. The cluster module 116 matches every time-series against all the centers of time-series using the LSH tables 122. A time-series will be assigned to a cluster if the cluster's center has the smallest distance with the time-series out of all centers and the distance is smaller than the distance threshold. Thus, a particular cluster may include multiple time-series that are more similar to each other in one or more aspects than other time-series of other clusters. In some implementations, a center of a time-series cluster is a time-series whose values are the average values of all time-series within the cluster.

Determination of PAA Parameters

Given a time-series data set, the transformer module 110 transforms the time-series data set 112 into a feature space with much lower dimension compared to raw time-series data. Transforming data into the feature vector set 114 with smaller dimension can significantly reduce computation costs. In some implementations, data reduction is implemented through PAA. In order to apply PAA to the time-series data set 112, the number of segments into which to divide each time-series may be determined. The appropriate number of segments may vary for different data sets.

PAA divides a time-series $T=t_1, t_2, \ldots, t_m$ with M (M<<m) equally sized segments and represents each segment with the averaged value of data points in the segment. The generated feature vector can be represented as $\bar{T}=\{\bar{T}_i\}$, where:

$$\bar{T}_i = \frac{M}{m} \sum_{j=\frac{m}{M}(i-1)+1}^{\frac{m}{M}i} t_j,$$

where M denotes the number of equally sized segments and m denotes the number of numerical values in the time-series.

The best value of M for a given time-series data set depends on factors such as the desired data reduction rate and data reduction error. Smaller M will cause a larger data reduction rate and larger data reduction error. In contrast, a larger M will cause a smaller data reduction rate and smaller data reduction error. In order for a user to make an informed decision regarding the value for M, a model can be developed for measuring the data reduction error and the data reduction rate.

In some implementations, PAA's effect on a time-series can be analyzed in the frequency domain. PAA has similarities to using a low-pass filter because PAA uses average values of segments to represent the original time-series. High frequency components of a time-series will be reduced by a smoothing operation (e.g., averaging each segment). The length of each segment (e.g., m/M) determines the cut-off frequency of the low-pass filter.

In some implementations, a large M corresponds to a short smoothing window (e.g., segments), which leads to a high cut-off frequency. At one extreme, if M=m, then the cut-off frequency equals the frequency up-bound of the original time-series, and both data reduction error and data reduction rate are zero. At the other extreme, if M=1 (e.g., using the average value to represent a time-series), then the data reduction rate is 1−1/m and the data reduction error is the variance of data in the time-series. Therefore, selecting a suitable value of M involves a trade-off between the data reduction error and the data reduction rate.

In some implementations, a power-spectrum-based algorithm is used to determine a value of M, in order to ensure that at least some or most time-series have a small mean square error compared after implementing PAA. Because PAA can be modeled as a low-pass filter, according to signal processing theory, the mean square error between a transformed time-series after PAA and the original time-series is approximately equal to the energy of high frequency (e.g., beyond cut-off frequency) components that are suppressed by the low-pass filter.

Therefore, the power spectrum of the time-series can be calculated, and a suitable cut-off frequency can be selected such that for a significant percentage (ratio greater than a threshold $\beta$) of time-series, the energy of the low frequency (lower than the cut-off frequency) components will retain a significant percentage (ratio greater than a threshold $\alpha$) of the energy of the raw, original time-series. The value of M corresponding to the cut-off frequency can then be calculated. This procedure is described in more detail below.

First, the transformer module 110 determines a cut-off frequency for each time-series based on power spectrum analysis. For a time-series $T=\{t_i\}$, i=1, ..., m, transformer module 110 uses discrete Fourier transform (DFT) to decompose the time-series into a set of complex sine waves with different frequencies. The DFT transform is:

$$X_k = \frac{1}{m} \sum_{j=1}^{m} t_{ij} e^{-i2\pi \frac{k}{m} j},$$

where $X_k$ indicates the coefficient of the component with frequency $$2\pi \frac{k}{m}$$

in the original time-series and k represents the point index of the data-series on the frequency domain. The energy of the component with frequency $$2\pi \frac{k}{m}$$

is $\|X_k\|^2$. Next, the transformer module 110 determines a cut-off frequency $k_0$ that has the minimal value satisfying the following formula:

$$\frac{\sum_{j=1}^{k_0} |X_k|^2}{\sum_{j=1}^{m/2} |X_k|^2} \geq \alpha. \quad (1)$$

The ratio of kept energy (energy of components whose frequencies are below $k_0$) is no less than $\alpha$. In other words, the ratio of lost energy (e.g., mean square error) from the original time-series T to the low-frequency time-series T' (e.g., the time-series consisting only of the components whose frequencies are not bigger than $k_0$) is no more than (1−$\alpha$). With a value for a that ensures the low-frequency time-series has a satisfying approximation of the original time-series, transformer module 110 can calculate the cut-off frequency $k_0$ according to formula (1).

Next, the transformer module 110 collects cut-off frequencies of the time-series, arranges them in ascending order, and selects $\beta$-percentile of the cut-off frequencies as the final cut-off frequency (cf). In some implementations, cf is selected to guarantee that the $\beta$ percentage of the time-series keeps more than a percentage of energy in the low-frequency components (e.g., ≤cf).

According to some implementations, the transformer module 110 then determines the number of segments M as 2*cf. According to the sampling theory in signal processing, for a low-frequency series whose highest frequency is cf, the series can be reconstructed from data that is sampled with the sampling rate 2*cf. Since the low-frequency series is a good approximation of the original time-series, the same sampling rate 2*cf is used to sample the original time-series T. Thus, T is divided into 2*cf segments. Finally, transformer module 110 uses the average value to represent each segment.

Determination of Cluster Population

After transforming the time-series data set 112 to feature space using PAA, the cluster module 116 determines or estimates the cluster populations, including the number of clusters, the center of each cluster and the diameters of clusters. First, the cluster module 116 randomly samples a subset of the time-series from the full time-series data set 112. The population of the sampled set will be similar to the overall population of the full data set. Since data sets in the real world typically have low intrinsic dimensionality, the cluster module 116 can determine an appropriate number of samples that are similar to the population of the full data set. In some examples, users may be satisfied with the clustering results of time-series data sets when the number of clusters ranges from 2 to 100. Moreover, when implementing pivoting, users may desire to view a smaller number of groups (e.g., from 2 to 100 groups). In some implementations, the cluster module 116 chooses a number of samples of approximately 10,000. In other implementations, a smaller or larger number of samples may be selected by the cluster module 116. The time-series data set that is randomly sampled from the full data set D is denoted as $D_{sam} = \{T_i\}$, i=1, ..., $N_0$.

In some implementations, in order to determine the cluster population or to get a rough estimation of the cluster population, the cluster module 116 uses SAX to obtain a symbolic representation for a time-series data set. By implementing SAX for time-series analysis, the cluster module 116 reduces the amount of data to be processed. Implementing SAX further discretizes the feature vector obtained by PAA to a symbol sequence. As discussed above, a time-series T with m numerical values may be mapped to a vector with M numerical values $\overline{T}$ by PAA. The vector can be further transformed by SAX to a new vector $S = s_1, \ldots, s_M$ with M symbols by encoding the M numerical values as M symbols, $s_i$ is mapped from $\overline{T}_i$. In some examples, the cardinality of the symbol space is relatively small (e.g., from 2 to 10). In some implementations, a cardinality of 2 or 3 is sufficient. In some implementations, if the cardinality of the symbol space is card, then the full range of possible values will be segmented into card segments. A numerical value will be encoded as one of the card symbols, based on the index of the segments where the value falls into.

In some implementations, each time-series can be considered as one point in a higher-dimension space. SAX is used to partition the space into a series of sub-regions and to obtain a rough data distribution by accounting for a number of data points within each sub-region. Thus, the rough data distribution can further guide the sampling of each time-series.

By simply grouping the code vector of time-series in $D_{sam}$, the cluster module 116 obtains:

$$D_{sam} := \{C^i\}, i=1, \ldots, cl \quad (2)$$

where $C^i$ is a group of all the time-series that maps to a single symbol vector $S^i$. The number of time-series in $C^i$, denoted as Freq($C^i$), satisfies the following equations:

$$\text{Freq}(C^1) \geq \text{Freq}(C^2) \geq \ldots \text{Freq}(C^{cl}) \quad (3)$$

and $$\Sigma_{i=1}^{cl} \text{Freq}(C^i) = |D_{sam}|, \quad (4)$$

where $|D_{sam}|$ denotes the number of time-series in $D_{sam}$. There are cl rough populations of time-series in $D_{sam}$, where $C^1$ is the first community with the highest number of time-series, all of which are similar to each other in that they map to the same code vector.

To remove the trivial (e.g., long-tail groups (e.g., Freq($C^x$)~1)) from $\{C^i\}$, i=1, ..., cl, a tail-cutting sampling technique may be used. The tail-cutting sampling technique removes the trivial groups, but also preserves the overall distribution of $\{C^i\}$ with a confidence level a by using a Kolmogorov-Smirnov test. Detailed steps are illustrated as follows. First, a confidence level a is set (a real value between 0 and 1), and then an integer T (tail index) is identified, so that the groups $\cup_{i \leq T} C^i$ can represent $\cup_{i \leq cl} C^i$ with confidence level a. In some implementations, the above steps may be carried out according to the following pseudo-code:

```
Procedure EstimateTailIndex
Input:
  rough population {C^i}, i = 1, ... , cl,
  |C^i| ≥ |C^{i+1}| when i ≤ cl - 1 ; α : confidence level; K_α :
  Kolmogorov coefficient based on α; N = |D_{sam}|.
Output:
  T
Begin
  Set T = 1
  For i =1, . . . , cl
        i
   M = Σ Freq(C^j)
       j=1

D_i = max{ Freq(i + 1)/N , Freq(1) (N - M)/NM }
   if √M D_i > K_α
     then T = i;
     return;
  Endfor
End
```

In some implementations, the time complexity of this algorithm is approximately O(cl). In some implementations, a binary search can be used to speed up the algorithm to a time complexity of approximately O(log(cl)).

In some implementations, a density-based clustering technique similar to DBSCAN (or other suitable techniques) is applied to a sampled time-series set TS. TS is obtained from the time-series set in $\{\overline{T}_j | T_j \in \cup_{i \leq T} C^i\}$, where T is estimated by the above procedure EstimateTailIndex and $\overline{T}_j$ is the time-series after PAA of the corresponding $T_j$ (the original time-series). A portion of time-series in $C^i$ is put into TS by a random sampling ratio r, in order to obtain a better representative set of time-series TS (this can be much better than simply randomly sampling the full time-series set). To improve the efficiency of this step, R*-Tree is applied to index the neighborhood information for each time-series. In some implementations, the overall time complexity is approximately O(N log N). This step groups the time-series into several clusters, G={g}.

Thus, in some implementations, identifying clusters by applying density-based clustering to a sampled time-series set may involve several steps. The first step, which estimates the proper and various densities, may be a very important step. An algorithm, named model-based density estimation algorithm, identifies multiple densities fast and effectively, based on the k-dis curve. As used herein, k-dis means the distance between a time-series and its kth nearest time-series. The k-dis curve is obtained as follows: for each point (a time series represented in the high dimensional space), its kth nearest point is obtained. Then the corresponding distance is recorded. Such distances for all the points are collected. The points are sorted by the distances, then listed in order from the largest distance to the smallest distance. Such an arrangement of points is a k-dis curve. The inflection points in this curve indicate there are different areas in the feature space with different densities. By identifying inflection points in the k-dis curve, the multi densities in the feature space can be estimated. Inflection points separate k-dis into multiple segments, and each segment may have a good fit to a model, e.g., a line with a slope and an offset. An optimal selection of inflection points can lead to an obtained model that has the smallest fitting error and the biggest difference among models in different segments.

Our algorithm identifies inflection points as follows: if one point is an inflection point, then a model is estimated for the left-side points and right-side points, respectively. Then, the similarity of the two models is measured. For each point, the corresponding similarity score is obtained. Then the lowest value among all the points is obtained. If the lowest value is smaller than a given threshold (which may be very close to 1, here it is 0.99), then this point is an inflection point. Such inspection is performed recursively on the right part of the curve, until no more inflection points are identified. Since the left-side of a k-dist curve are data points with highest k-dist values, indicating they are outliers, there is no need to identify inflection points in left-part again. In the example implementation, the model is a linear model and the similarity metric of two models is the difference of the slopes. However, any suitable models with a suitable similarity metric can also be applied with the algorithm (e.g., Gaussian models).

In some implementations, the k-distribution curve is identified in order to estimate the proper density-distance and minimum-points. Then, the core-points which satisfy a certain criterion (derived from the density-distance and minimum-points) are determined based on the model-based density estimation algorithm. Then, the connected components can be identified from a graph. In particular, the clustering procedure is works by inspecting from the most dense value to the least dense value, so that the densest regions can be first identified. Then, the less dense regions can be identified, and so on. The benefit of such a procedure is that the two different clusters can be isolated, even though the denser cluster is embedded in the less dense cluster. Then, the connected components can be identified from a graph. The R*-Tree and some other derived data structure can be used to index neighborhood information of each point, which may cause the overall complexity to be approximately O(N log N), as discussed above.

Clustering Based on LSH

Next, the border-core-points are identified, and the left points (the points not be selected after sampling) are assigned to each cluster. In some implementations, border-core-points are defined as follows. For each core-point, if all of its connected points are core-points, then it is an intra-core-point; otherwise, it is a border-core-point. For each new point (the points that need to be assigned to a cluster ID), the closest border-core-point is identified, and the corresponding cluster id (of the border-core-point) is assigned to the new point. To speed up this step, LSH, or other suitable techniques, is used to assign each time-series in the data set to a closed border-core-point. For each time-series T with PAA vector $\bar{T}$, LSH is able to return $\{\bar{T}_i | i=1, \ldots, r, \text{Dist}(\bar{T}, \bar{T}_i) < d\}$ with probability $1-\delta$, where $\delta$ is a constant as confidence level, e.g., $\delta=0.05$. In some implementations, the cluster module 116 generates multiple clusters by assigning each of the time-series to one of multiple border-core-points based, at least in part, on hash values. In some implementations, the cluster module 116 assigns time-series in a data set D to r set of border-core-points (each set represent the border of one particular cluster) according to the following pseudo-code:

---

Procedure AssignTimeSeries
Input: time-series data set D; PAA vector of r set of border-core-points, $\{\bar{T}_1\}, \ldots, \{\bar{T}_r\}$; distance threshold d; confidence level $\delta$
Output: clusters $\{CC_i\}, i = 1, \ldots, r$
Begin
    Determine L based on $\delta$ and LSH theory, L is the number of LSH tables
    //build hash-table
    For each $\{\bar{T}_i\}$ in $\{\bar{T}_1\}, \ldots, \{\bar{T}_r\}$
        $g_{i,j} = [h_{j,1}(\{\bar{T}_i\}), \ldots, h_{j,k}(\{\bar{T}_i\})]$, $h_{j,m}$ is randomly selected from 1-stable LSH function family, $j = 1, \ldots, L$
    End for
    Set $CC_i = \{\bar{T}_i\}, i = 1, \ldots, r$
    For each $T \in D$
        $g(T) = [h_{j,1}(T), \ldots, h_{j,k}(T)]$
        Retrieve a subset $\{\bar{T}_m\}$ from $(\bar{T}_1, \ldots, \bar{T}_r)$ where $g(\bar{T}_m)$ and $g(\bar{T})$ are matched at least for one Hash function.
        Identify $\bar{T}_{m'}$ from $\{\bar{T}_{mat}\}$, where Dist($\bar{T}_{mat}$, T) > Dist($\bar{T}_{m'}$, T), $\bar{T}_{m'} \in (\bar{T}_1, \ldots, \bar{T}_r)$, m' $\neq$ mat.
        $CC_{m'} = CC_{m'} \cup T$
    End for
End.

---

Meanwhile, abnormal time-series can also be eliminated. The time-series of each group can be mapped back to the single symbol vector, denoted $D_g := \{C_g^i\}$, $i=1, \ldots, cl_g$, where $C_g^i$ is a group of all the time-series belonging to cluster g that map to a single symbol vector $S^i$. In some implementations, each cluster g is divided into several sub groups, due to the consideration of the "long French bread" concern: some time-series located at the same cluster g, may have a significant different distance, because a continuous shift may exist from one time-series to another (this is why they are clustered together). These time-series can be separated apart to gain a better visualization for end users. The detailed steps are illustrated as follows (the following steps can have input: $D_g := \{C_g^i\}$, $i=1, \ldots, cl_g$, where $C_g^i$ is a group of all the time-series belonging to cluster g that map to a single symbol vector $S^i$).

First, the cluster module 116 defines a center PAA vector $\bar{T}_j^{Cen,i}$ for $C_i$:

$$\bar{T}_j^{Cen,i} = \text{Median}(\{\bar{T}_j^s | T^s \in C_g\}), j=1, \ldots, M, \quad (5)$$

where the PAA value of the center $\bar{T}^{Cen,i}$ in one segment is equal to the median value of the PAA value of the same segment of all time-series in $C_g^i$.

Given a distance threshold d, the time-series in $D_g$ can be separated into several sub-groups, such that the upper bound of any two different time-series in one sub-group cannot exceed d. Under such constraints (called the property "meaningful"), the overall number of sub-groups can be minimized (minimization refers to the property of "compact" covering), referred to as an optimization problem of set-covering. To solve this problem, a heuristic algorithm can be identified, as illustrated in the following pseudo-code:

```
Procedure EstimatePopulation
Input:
   rough population {C_g^i}, i = 1, ... , cl_g,
   |C_g^i| ≥ |C_g^{i+1}| when i ≤ cl_g − 1; distance threshold d
Output:
   sub-groups G_g = {sg_g}sg_g
Begin
      Set C_rest = ∪_i C_g^i , i = 1, ... , cl_g
      Set G_g = Ø
      Set i = 1
      While C_rest is not Ø
            Set g = Ø
            Add C_g^i to g
            Assign all C^j in C_rest to g that satisfies
         Dist(T^{cen,i}, T^{cen,j}) < d/2
            G_g = G_g ∪ G_g g
            C_rest = C_rest \g
            Update i, so that C_g^i is the biggest group in C_rest
      End While
End
```

Based on the triangle inequality relationship and the distance between the first center in g and any center in g being smaller than d/2, the population G obtained by the above pseudo code has the following property: the distance between any two centers in a same group g in G is smaller than d.

Since different data sets have different characteristics, the appropriate distance threshold may change, depending on the data set. In some implementations, an iterative approach can be used to determine an appropriate distance threshold among a set of candidate distance thresholds. For each candidate threshold, the cluster module 116 can evaluate the internal quality of the grouping result, as described below.

First, the cluster module 116 determines or estimates a maximum possible distance threshold as:

$$d_{max} = \max_j Dist(\overline{T}^{cen,1}, \overline{T}^{cen,i}), i = 2, \cdots, cl, \quad (5)$$

where $d_{max}$ is the maximum distance between the center time-series of $C^1$ and the center time-series of other communities. In some implementations, an appropriate distance threshold can be smaller than $d_{max}$. In some implementations, the cluster module 116 determines a mapping between granularity levels and corresponding distance thresholds according to the following pseudo-code:

```
Procedure EstimateDistanceThreshold
Input:
   rough population {C^i}, i = 1, ... , cl,
   |C^i| ≥ |C^{i+1}| when i ≤ cl − 1 ; l: the number of clustering granu-
   larity levels; d_max, Q_min: a minimal value of quality threshold
Output:
   d_1, ... , d_l
Begin
   d_step = d_max/k, k is a constant integer
   For i = 1, . . . , k
      d(i) = d_step * i
      G = EstimatePopulation({C^i}, d(i))
      Q(i) = CalQualityMetric( G )
   Endfor
   Find minimal i_min and maximal i_max so that Q(i_j) ≥ Q_min
   for any i_min ≤ j ≤ i_max
```

Set $d_1 = d_{i_{min}}$, $d_l = d_{i_{max}}$, and $d_i = \frac{i-1}{l-1}(d_l - d_1) + d_1$ End In the above pseudo-code, k is the number of different threshold values sampled in the range of $[0,d_{max}]$. The cluster module 116 executes the EstimatePopulation procedure for each distance threshold and evaluates the quality of the estimated population. CalQualityMetric is a procedure that estimates the quality of a population G. In some implementations, a metric for determining the quality of the population G is the number of clusters. Thus, the quality score will be high if the number of clusters is within a particular range (e.g., within a lower threshold value and upper threshold value). In some implementations, the cluster module 116 selects or identifies a population if the number of clusters is within the lower threshold value and the upper threshold value. In some implementations, a user selects the lower threshold value and the upper threshold value. In some examples, the cluster module 116 may implement one or more additional types of metrics instead of or in addition to the above metric. For example, the cluster module 116 may implement a "silhouette" to evaluate the quality of the population results.

Given the mappings between the granularity levels and the distance threshold values, the cluster module 116 can determine the number of seeds and the seed time-series for each granularity level. For each granularity level, the population G can be obtained by the procedure EstimatePopulation. For each group in G, the cluster module 116 collects all time-series that correspond to the seeds of G, and finds an updated center of G using equation (5).

Example Process

In the following flow diagrams, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the process. While several examples are described herein for explanation purposes, the disclosure is not limited to the specific examples, and can be extended to additional devices, environments, applications and settings. For discussion purposes, the processes below are described with reference to the environment 100 of FIG. 1, although other devices, systems, frameworks, and environments can implement this process.

Figure 5:
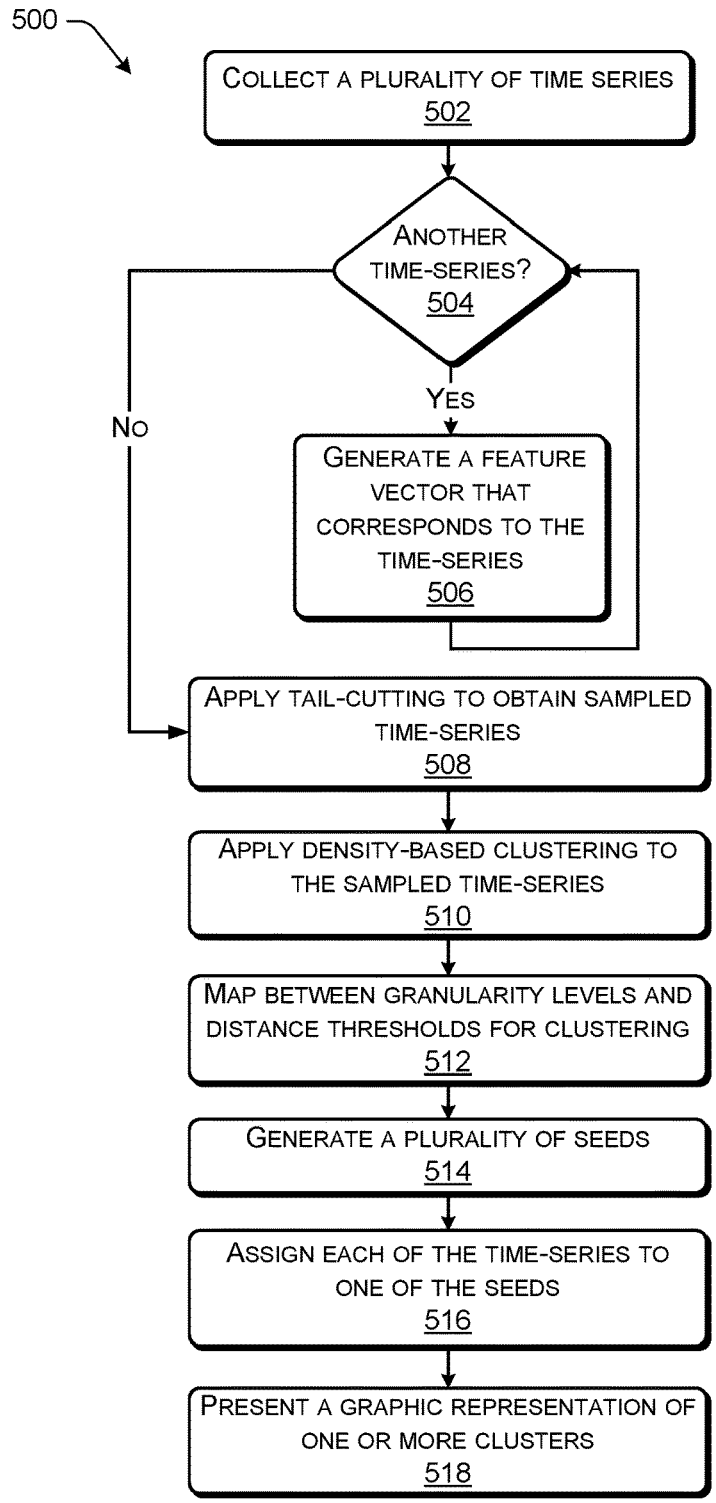
FIG. 5 is a flow diagram of an example process of grouping multiple time-series according to some implementations.

FIG. 5 is a flow diagram of an example process 500 of grouping multiple time-series according to some implementations.

At 502, the cluster module 116 collects a plurality of time-series. In some implementations, each of the plurality of time-series comprises a series of numerical values.

At 504, if the cluster module 116 determines if there is another time-series to process.

At 506, if there is another time-series to process, then the transformer module 110 generates a feature vector that corresponds to the time-series. The process then returns to block 504, where, if there is not another time-series to process, the process goes to block 508.

At 508, the cluster module 116 applies the tail-cutting sampling technique to obtain fewer time-series (a sampled time-series) while preserving the original distribution of $\{C^i\}$ with a confidence level a, as described above.

At 510, the cluster module 116 applies density-based clustering to the sampled time-series to identify each cluster.

At 512, the cluster module 116 maps between granularity levels and distance thresholds used for clustering, based upon a subset of the multiple feature vectors.

At 514, the cluster module 116 generates a plurality of seeds that correspond to one of the granularity levels, based upon the mapping of block 512. In some implementations, the one of the granularity levels is selected by a user.

At 516, the cluster module 116 assigns each of the plurality of time-series to one of the plurality of seeds. In some examples, the cluster module 116 assigns each of the plurality of time-series to one of the plurality of seeds based upon locality sensitive hashing (e.g., LSH table, as described above).

At 518, the cluster module 116 causes a display to present a graphic representation of at least one of the plurality of the clusters. For example, the display may present one or more clusters that include multiple time-series. In some implementations, the graphic representation of at least one of the plurality of the clusters indicates resource consumption of at least one of a plurality of computing devices during a particular time period, as discussed above.

Example Computing System

Figure 6:
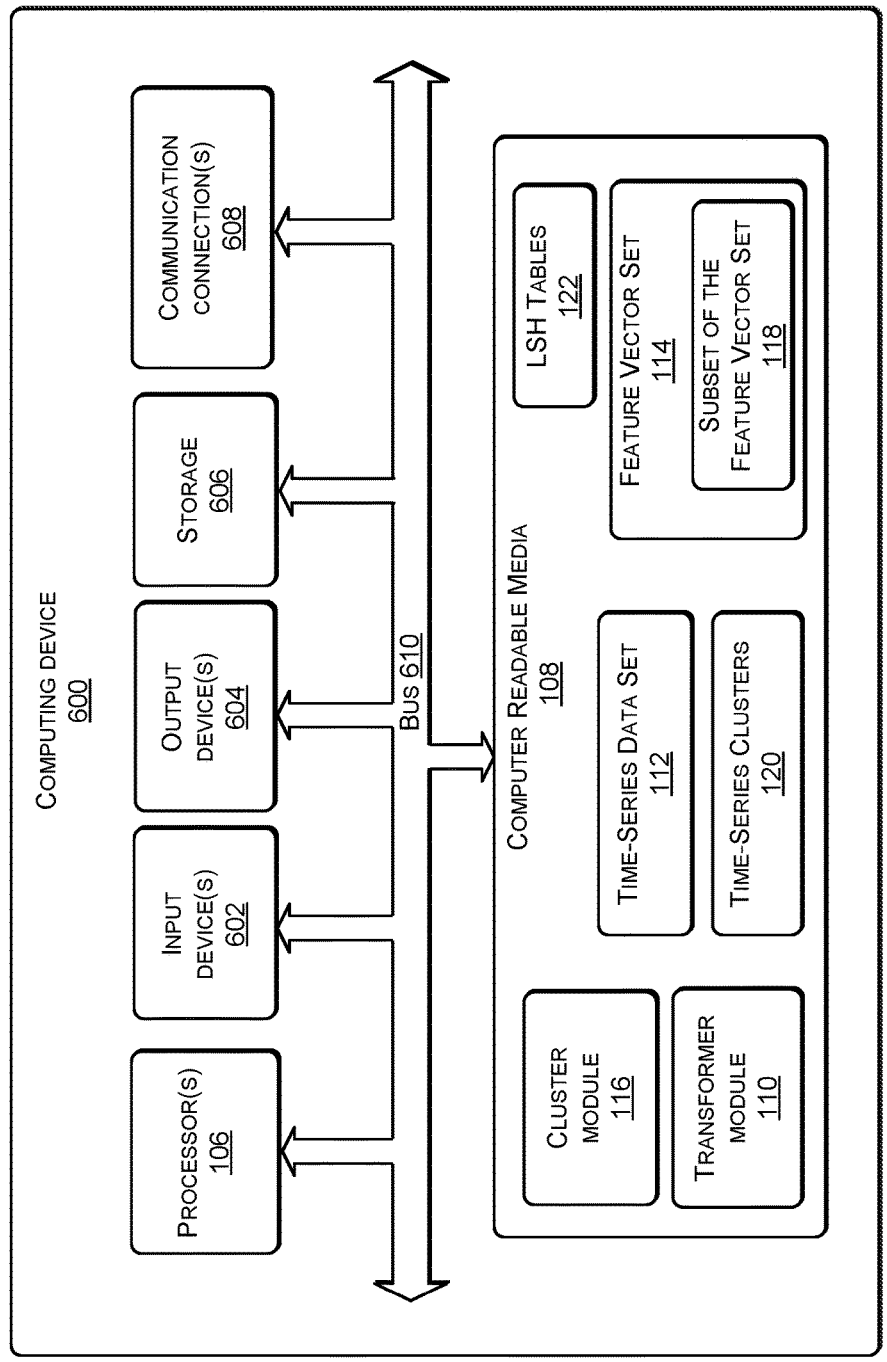
FIG. 6 is a block diagram illustrating a representative computing device that can implement grouping of multiple time-series.

FIG. 6 is a block diagram illustrating a representative computing device 600 that can implement erasure coded storage. For example, the computing device 600 can be a server, such as one of the servers 104, or the client 124, as described in FIG. 1. However, it will be readily appreciated that the techniques and mechanisms can be implemented in other computing devices, systems, and environments. The computing device 600 shown in FIG. 6 is only one example of a computing device and is not intended to suggest any limitation as to the scope of use or functionality of the computer and network architectures.

In the illustrated example, the computing device 600 includes one or more processors 106, one or more computer-readable media 108 that includes the transformer module 110, the cluster module 116, the time-series data set 112, the time-series clusters 120, the LSH tables 122, the feature vector set 116, and the subset of the feature vector set 118, one or more input devices 602, one or more output devices 604, storage 606 and one or more communication connections 608, all able to communicate through a system bus 610 or other suitable connection.

In some implementations, the processor 106 is a microprocessing unit (MPU), a central processing unit (CPU), or other processing unit or component known in the art. Among other capabilities, the processor 106 can be configured to fetch and execute computer-readable processor-accessible instructions stored in the computer-readable media 108 or other computer-readable storage media. Communication connections 608 allow the device to communicate with other computing devices, such as over a network 108. These networks can include wired networks as well as wireless networks.

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media can embody computer-readable instructions, data structures, program modules, or other data in a modulated data signal, such as a carrier wave. As defined herein, computer storage media does not include communication media.

Computer-readable media 108 can include various modules and functional components for enabling the computing device 600 to perform the functions described herein. In some implementations, computer-readable media 108 can include the transformer module 110 and the cluster module 116 for performing grouping of multiple time-series and operations related to grouping of multiple time-series. The transformer module 110 and/or the cluster module 116 can include a plurality of processor-executable instructions, which can comprise a single module of instructions or which can be divided into any number of modules of instructions. Such instructions can further include, for example, drivers for hardware components of the computing device 100.

The transformer module 110 and/or the cluster module 116 can be entirely or partially implemented on the computing device 600. Although illustrated in FIG. 6 as being stored in computer-readable media 108 of computing device 600, the transformer module 110 and the cluster module 116, or portions thereof, can be implemented using any form of computer-readable media that is accessible by computing device 600. In some implementations, the transformer module 110 and/or the cluster module 116 are implemented partially on another device or server. Furthermore, computer-readable media 108 can include other modules, such as an operating system, device drivers, program data, and the like, as well as data used by the cluster module 116 and other modules (e.g., the time-series data set 112, the time-series clusters 120, the LSH tables 122, the feature vector set 116, and the subset of the feature vector set 118).

Computer-readable media 108 or other machine-readable storage media stores one or more sets of instructions (e.g., software) embodying any one or more of the methodologies or functions described herein. The instructions can also reside, completely or at least partially, within the computer-readable media 108 and within processor 106 during execution thereof by the computing device 600. The program code can be stored in one or more computer-readable memory devices or other computer-readable storage devices, such as computer-readable media 108. Further, while an example device configuration and architecture has been described, other implementations are not limited to the particular configuration and architecture described herein. Thus, this disclosure can extend to other implementations, as would be known or as would become known to those skilled in the art.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and can be implemented in general purpose and special-purpose computing systems, or other devices having processing capability. Generally, any of the functions described with reference to the figures can be implemented using software, hardware (e.g., fixed logic circuitry) or a combination of these implementations. Thus, the processes, components and modules described herein can be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one example" "some examples," "some implementations," or similar phrases means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
collecting a plurality of time-series, wherein each of the plurality of time-series comprises a series of numerical values;
generating a plurality of feature vectors, wherein each of the plurality of feature vectors corresponds to one of the plurality of time-series, each feature vector having fewer elements than a number of elements of the corresponding time series, each element in the feature vector being an average value of a segment from elements in the corresponding time series;
clustering the plurality of time-series into a plurality of clusters, based on the plurality of feature vectors, a granularity level, and a distance threshold for the clusters, the clustering further comprising:
generating a plurality of seeds for centers the plurality of clusters based on the granularity level;
iteratively updating the center of each cluster until the granularity level and distance threshold are achieved; and
assigning each of the plurality of time-series to one of the plurality of clusters; and
presenting information about the clustering in a user interface.

2. The method as recited in claim 1, wherein generating the plurality of feature vectors comprises:
determining a number for dividing each of the plurality of time-series;
dividing each of the plurality of time-series by the number to form a plurality of segments for each time-series, wherein each of the plurality of segments comprises an approximately equal number of numerical values; and
averaging numerical values within each segment of each of the plurality of segments.

3. The method as recited in claim 2, wherein determining the number for dividing each of the plurality of time-series comprises:
calculating a power spectrum of each of the plurality of time-series;
selecting a cut-off frequency such that for at least a first threshold percentage of the plurality of time-series, an energy of frequency components below the cut-off frequency is at least a second threshold percentage of an energy of the plurality of time-series; and
determining the number based, at least in part, on the cut-off frequency.

4. The method as recited in claim 3, wherein determining the number based, at least in part, on the cut-off frequency comprises multiplying the cutoff frequency by two.

5. The method as recited in claim 1, wherein generating the plurality of seeds further comprises:
transforming the subset of the plurality of feature vectors by encoding each numerical value of the plurality of feature vectors to a symbol based, at least in part, on a mapping of numerical values to symbols;
determining a distance threshold that corresponds to the one of the granularity level; and
generating the plurality of seeds based, at least in part, on the distance threshold.

6. The method as recited in claim 1, wherein the granularity level is selected based, at least in part, on user input.

7. The method as recited in claim 1, wherein the subset of the plurality of feature vectors is randomly sampled from the plurality of feature vectors.

8. The method as recited in claim 1, wherein the assigning each of the plurality of time-series to one of the plurality of seeds is based, at least in part, on locality sensitive hashing.

9. A system comprising:
one or more processors;
a memory that includes a plurality of computer-executable components, the plurality of computer-executable components comprising a module to:
collect a plurality of time-series, wherein each of the plurality of time-series comprises a series of numerical values;
generate a plurality of feature vectors, wherein each of the plurality of feature vectors corresponds to one of the plurality of time-series, each feature vector having fewer elements than a number of elements of the corresponding time series, each element in the feature vector being an average value of a segment from elements in the corresponding time series;
clustering the plurality of time-series into a plurality of clusters, based on the plurality of feature vectors, a granularity level, and a distance threshold for the clusters, the clustering further comprising:
generate a plurality of seeds for centers the plurality of clusters based on the granularity level;
iteratively updating the center of each cluster until the granularity level and distance threshold are achieved; and
assigning each of the plurality of time-series to one of the plurality of clusters; and
presenting information about the clustering in a user interface.

10. A computer-readable medium storing computer-executable instructions that, when executed, cause one or more processors to perform acts comprising:

collecting a plurality of time-series that corresponds to a plurality of computing devices, wherein each of the plurality of time-series comprises a series of numerical values that represents resource consumption by a respective one of the computing devices during a time period;

generating a plurality of feature vectors based, at least in part, on a power spectrum of each of the plurality of time-series, wherein each of the plurality of feature vectors corresponds to a respective one of the plurality of time-series, each feature vector having fewer elements than a number of elements of the corresponding time series, each element in the feature vector being an average value of a segment from elements in the corresponding time series;

identifying a plurality of clusters by applying density-based clustering to at least a portion of the plurality of feature vectors;

mapping between granularity levels and distance thresholds for each of a plurality of the clusters, based, at least in part, on a subset of the plurality of feature vectors;

generating a plurality of seeds that corresponds to one of the granularity levels based, at least in part, on the mapping, wherein the one of the granularity levels is selected based, at least in part, on user input;

assigning each of the plurality of time-series to one of the plurality of clusters based, at least in part, on hash values; and presenting a graphic representation of at least one of the plurality of the clusters to indicate resource consumption of at least one of the computing devices during the time period.

* * * * *